(12) United States Patent
McNutt et al.

(10) Patent No.: US 9,021,210 B2
(45) Date of Patent: Apr. 28, 2015

(54) CACHE PREFETCHING BASED ON NON-SEQUENTIAL LAGGING CACHE AFFINITY

(71) Applicant: International Business Machines Corporation, Armonk, NY (US)

(72) Inventors: Bruce McNutt, Tucson, AZ (US); Vernon W. Miller, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 13/765,343

(22) Filed: Feb. 12, 2013

(65) Prior Publication Data

US 2014/0229681 A1    Aug. 14, 2014

(51) Int. Cl.
*G06F 12/08*    (2006.01)

(52) U.S. Cl.
CPC .... *G06F 12/0862* (2013.01); *G06F 2212/6026* (2013.01); *G06F 2212/602* (2013.01)

(58) Field of Classification Search
CPC .................. G06F 2212/6026; G06F 2212/602; G06F 12/0862
USPC .................................. 711/137, 156, 159, 221
See application file for complete search history.

(56) References Cited

U.S. PATENT DOCUMENTS

| | | | |
|---|---|---|---|
| 5,561,782 A | 10/1996 | O'Connor | |
| 5,778,435 A | 7/1998 | Berenbaum et al. | |
| 5,970,508 A * | 10/1999 | Howe et al. | 711/113 |
| 6,092,149 A | 7/2000 | Hicken et al. | |
| 6,141,731 A | 10/2000 | Beardsley et al. | |
| 6,327,644 B1 | 12/2001 | Beardsley et al. | |
| 6,721,847 B2 * | 4/2004 | Hursey | 711/118 |
| 6,957,304 B2 * | 10/2005 | Wilkerson | 711/137 |
| 6,993,629 B2 | 1/2006 | Beardsley et al. | |
| 7,330,937 B2 * | 2/2008 | Chauvel et al. | 711/132 |
| 7,353,339 B2 * | 4/2008 | Komarla et al. | 711/137 |
| 7,406,569 B2 | 7/2008 | van de Waerdt | |
| 7,461,211 B2 | 12/2008 | Hakura et al. | |
| 7,546,601 B2 | 6/2009 | Byrd et al. | |
| 7,630,955 B2 | 12/2009 | Byrd et al. | |
| 7,661,135 B2 | 2/2010 | Byrd et al. | |
| 7,676,630 B2 * | 3/2010 | Qiao | 711/118 |
| 7,725,658 B2 * | 5/2010 | Lang et al. | 711/137 |
| 7,774,578 B2 | 8/2010 | Keltcher | |

(Continued)

OTHER PUBLICATIONS

Hur, Ibrahim et al., "Feedback Mechanisms for Improving Probabilistic Memory Prefetching", IEEE 15th International Symposium on High Performance Computer Architecture, Feb. 14-18, 2009, Raleigh, North Carolina, 12 pages.

(Continued)

*Primary Examiner* — Stephen Elmore
(74) *Attorney, Agent, or Firm* — Stephen R. Tkacs; Stephen J. Walder, Jr.; Randall J. Bluestone

(57) ABSTRACT

A mechanism is provided in a cache subsystem for cache prefetching based on non-sequential access. The mechanism determines frequently accessed non-sequential cache records in the cache subsystem. The mechanism collects trailing record statistics for the frequently accessed non-sequential cache records. The mechanism determines a caching strategy. The caching strategy comprises prefetching a set of trailing records responsive to a read of a given frequently accessed non-sequential cache record. The mechanism applies the caching strategy to the cache subsystem.

23 Claims, 4 Drawing Sheets

(56) References Cited

U.S. PATENT DOCUMENTS

2004/0034746 A1* 2/2004 Horn et al. .................... 711/141
2005/0138296 A1* 6/2005 Coulson et al. ............... 711/141
2011/0238923 A1 9/2011 Hooker et al.
2012/0084497 A1 4/2012 Subramaniam et al.
2012/0151149 A1 6/2012 Dubrovin et al.
2012/0151150 A1 6/2012 Rabinovitch et al.

OTHER PUBLICATIONS

Subha, S., "An Algorithm for Buffer Cache Management", IEEE 2009 Sixth International Conference on Information Technology: New Generations, Apr. 27-29, 2009, Las Vegas, Nevada, 5 pages.

* cited by examiner

| ACCESS # (IMPLICIT) | TRAILING RECORD SEQUENCE | STOP TRACKING RECORD |
|---|---|---|
| 1 | $E_1, E_2, ..., E_M$ | NULL |
| 2 | $E_1, E_2, ..., E_{j<M}$ | $E_{j+1}$ |
| 3 | NULL | $E_1$ |
| ... | | |

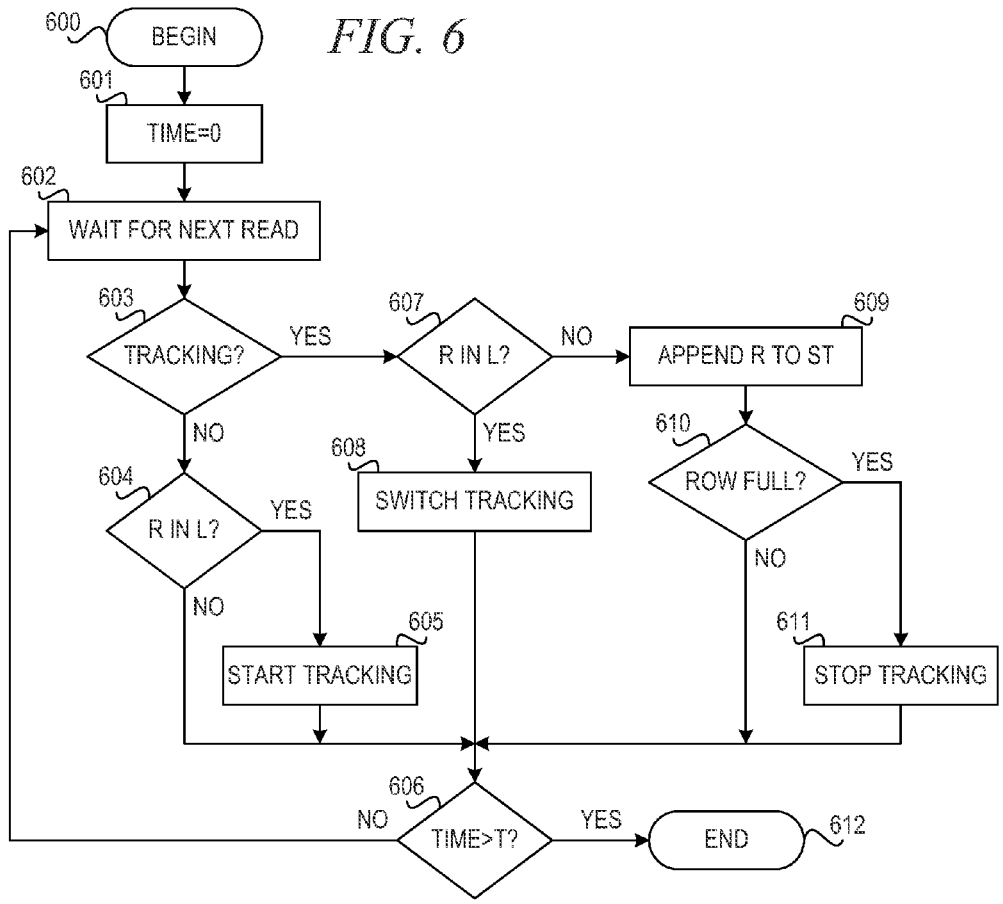

CACHE PREFETCHING BASED ON NON-SEQUENTIAL LAGGING CACHE AFFINITY

BACKGROUND

The present application relates generally to an improved data processing apparatus and method and more specifically to mechanisms for cache prefetching based on non-sequential lagging cache affinity.

A cache is a component that transparently stores data so that future requests for that data can be served faster. The data that is stored within a cache might be values that have been computed earlier or duplicates of original values that are stored elsewhere. If requested data is contained in the cache (i.e., cache hit), this request can be served by simply reading the cache, which is comparatively faster. Otherwise (i.e., cache miss), the data must be recomputed or fetched from its original storage location, which is comparatively slower. Hence, the greater the number of requests that can be served from the cache, the faster the overall system performance becomes.

Small memories on or close to the CPU can operate faster than the much larger main memory. Web browsers and web proxy servers employ web caches to store previous responses from web servers, such as web pages and images. Web caches reduce the amount of information that needs to be transmitted across the network, as information previously stored in the cache can often be reused. This reduces bandwidth and processing requirements of the web server, and helps to improve responsiveness for users of the web. Database caching can substantially improve the throughput of database applications, for example in the processing of indexes, data dictionaries, and frequently used subsets of data.

Prefetching is the operation of loading data or instructions in anticipation of their need. There are known solutions for access patterns that are easily detectable, such as sequential prefetching. However, these solutions for access patterns are not able to take advantage of access patterns that appear random but are in fact frequently repeated sequences of events.

SUMMARY

In one illustrative embodiment, a method, in a data processing system, is provided for cache prefetching based on non-sequential access. The method comprises determining frequently accessed non-sequential cache records in a cache subsystem. The method further comprises collecting trailing record statistics for the frequently accessed non-sequential cache records. The method further comprises determining a caching strategy. The caching strategy comprises prefetching a set of trailing records responsive to a read of a given frequently accessed non-sequential cache record. The method further comprises applying the caching strategy to the cache subsystem.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is a flowchart illustrating operation of collecting trailing record statistics in accordance with an illustrative embodiment; and FIG. 7 depicts an example of the format of a prefetch table in accordance with an illustrative embodiment.

DETAILED DESCRIPTION

The illustrative embodiments provide a mechanism for detecting repeated sequences of events that can be used to improve overall cache efficiency through prefetching or tiering. The mechanism improves cache efficiency by finding commonly trailing cache records associated with another record that are not sequential in nature and applying new caching strategies based on the information that will increase the overall number of cache hits associated with these records. The mechanism describes a method for first finding the most frequently accessed records. The mechanism then analyzes the data describing the records and their trailing records to 1) reject sequential access patterns via a blacklist, 2) find trailing records that are themselves part of the most frequently accessed records, and 3) determine potential candidates from the trailing records that could be used for new caching strategies. The results of the analysis are used to refine the list of frequently accessed records using the blacklist and to define a caching strategy based on list of frequently accessed records and the new caching strategies.

The term "caching strategy" refers to general strategy but could include prefetching of records or a change in the tiering of those records. After a caching strategy is applied, the effectiveness of the new strategy is optionally evaluated for some period of time. For example, the mechanism may compare cache hit ratios before and after the strategy is in place. After some time or if triggered by some event in the efficiency evaluation phase, the mechanism may start the whole cycle anew. Over tong periods of time, the algorithm will likely become more efficient due to updating the blacklist, which can occasionally be cleared.

Figure 1:
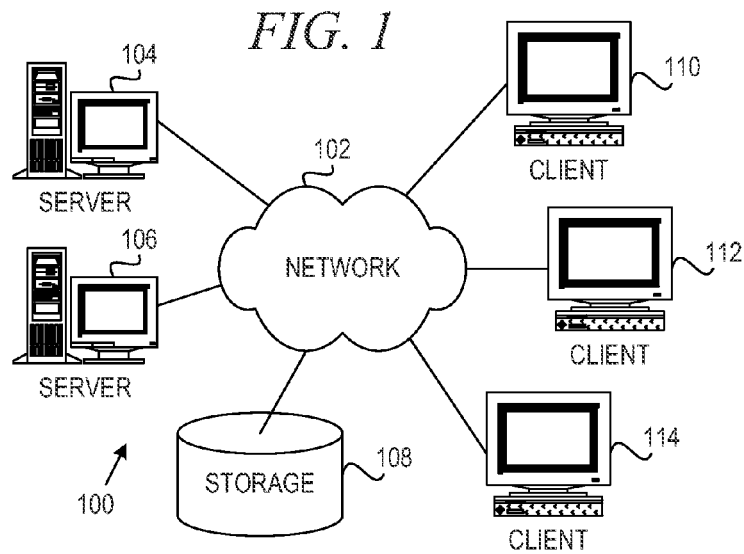
FIG. 1 depicts a pictorial representation of an example distributed data processing system in which aspects of the illustrative embodiments may be implemented.
Figure 2:
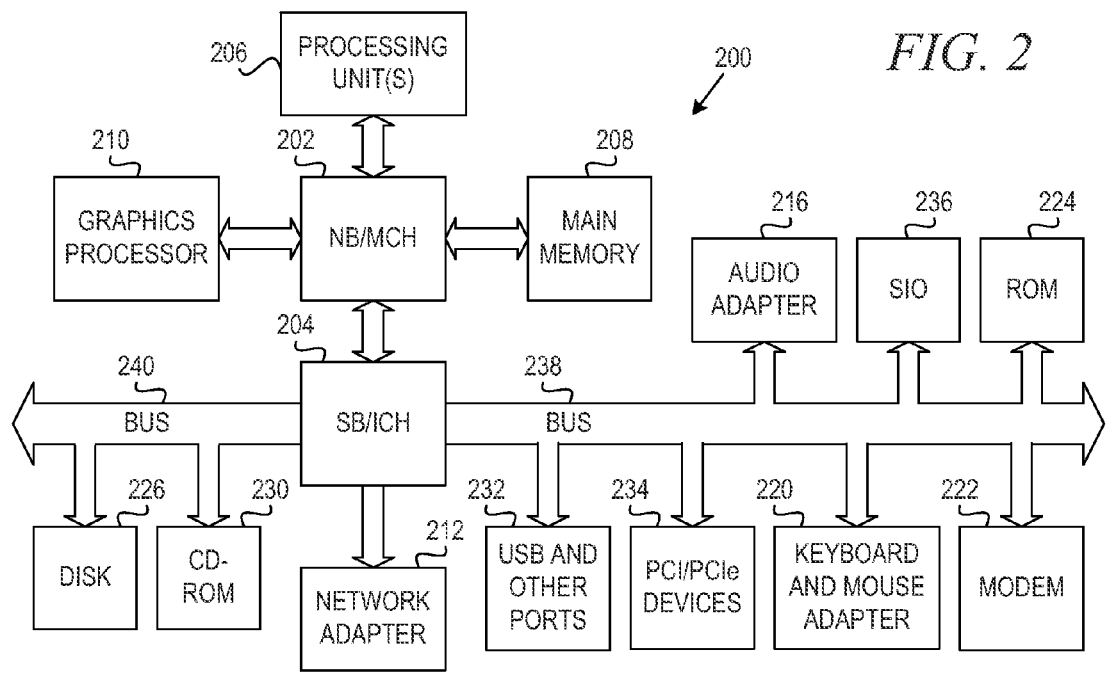
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The data processing systems depicted in FIGS. 1 and 2 may employ various cache systems. For example, storage 108 may employ a storage system or database system cache. Processing unit(s) 206 may employ an L1 and/or L2 cache. Disk 226 may use a cache. Software may manage hierarchical memory, or tiering. The illustrative embodiments described herein function within the context of a cache subsystem. The mechanisms of the illustrative embodiments may work with any caching system that stores records (cache entries) corresponding to a physical or logical address of a storage device. An example is a cache subsystem used in a block based or file based storage system, such as disk 226.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages, The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figures 3, 5:
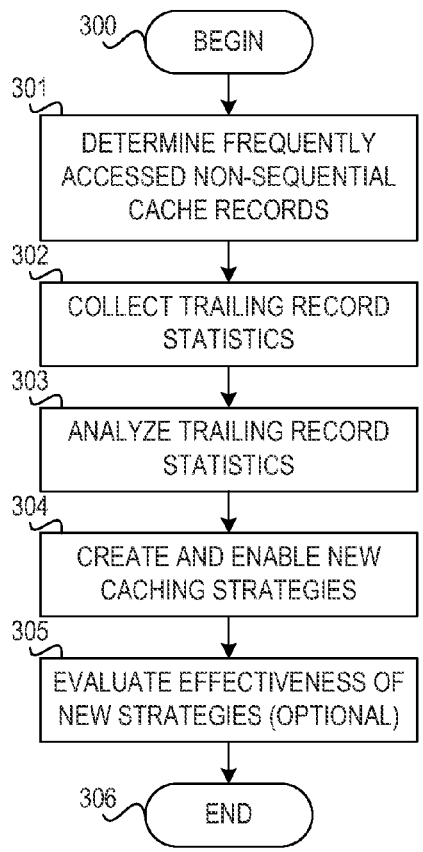
FIG. 3 illustrates phases of cache prefetching based on non-sequential lagging cache affinity in accordance with an illustrative embodiment.
FIG. 5 depicts an example of the format of a sub-table in accordance with an illustrative embodiment.

FIG. 3 illustrates phases of cache (prefetching based on non-sequential lagging cache affinity in accordance with an illustrative embodiment. Operation of cache prefetching begins (block 300). In phase 1 (block 301), the mechanism creates a list containing records that are frequently accessed and non-sequential in nature. Operation of creating a list of frequently accessed and non-sequential records is described in further detail below with reference to FIG. 2.

In phase 2 (block 302), the mechanism collects trailing record statistics for each record in the frequently accessed record list (FARL). In phase 3 (block 303), the mechanism analyzes the trailing record statistics to find potential candidates for prefetching. In phase 4 (block 304), the mechanism creates and enables a prefetching policy. In phase 5 (block 305), the mechanism evaluates the effectiveness of the new prefetching policy and strategies. Thereafter, operation ends (block 306).

Figure 4:
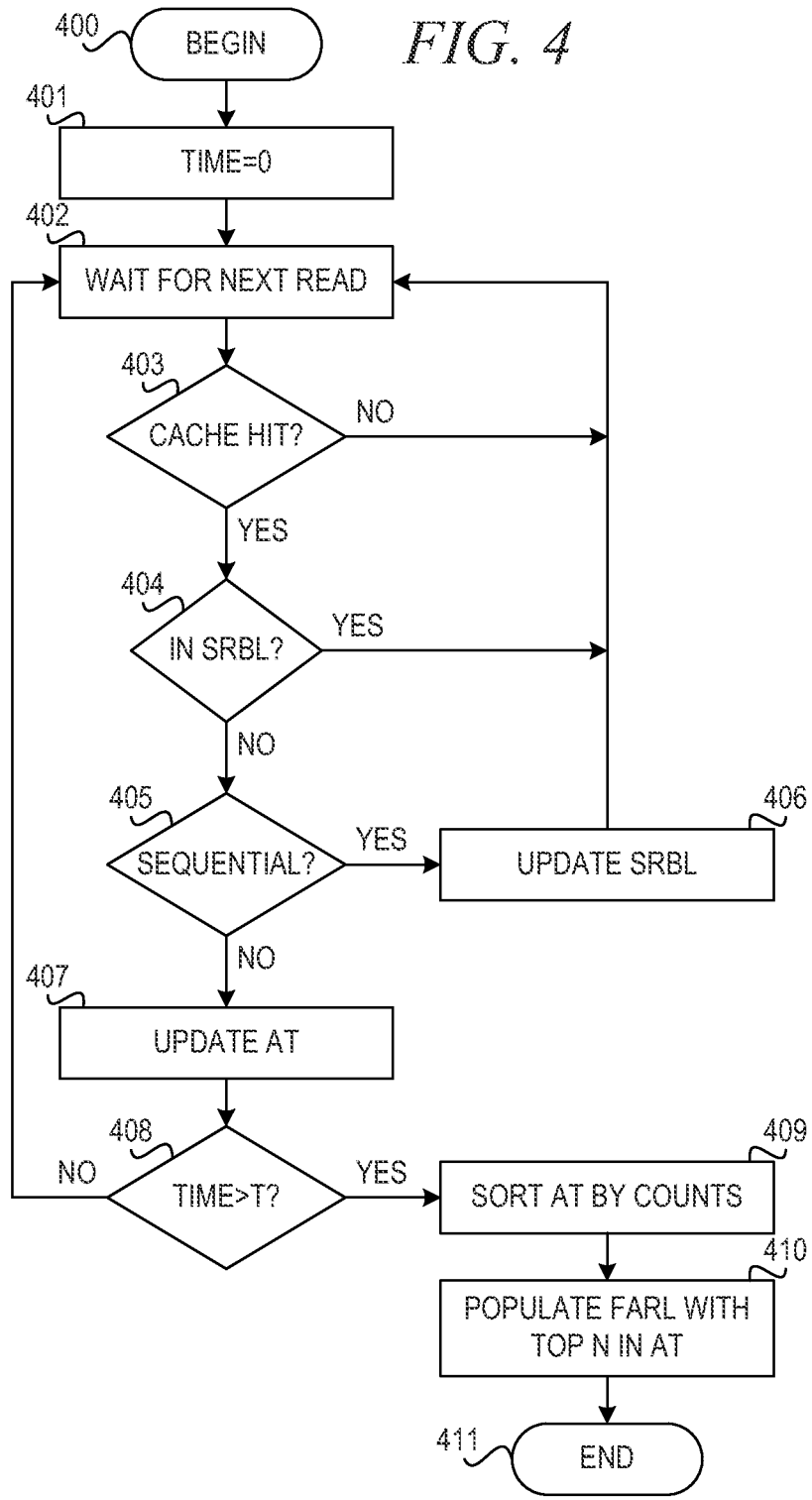
FIG. 4 is a flowchart illustrating operation of creating a list of frequently accessed records in accordance with an illustrative embodiment.

FIG. 4 is a flowchart illustrating operation of creating a list of frequently accessed records in accordance with an illustrative embodiment. Operation begins (block 400), and the mechanism sets time equal to zero to start a polling period of time T (block 401). During the polling period, all incoming requests to the cache subsystem are monitored. The mechanism waits for the next read request (block 402) and determines whether the read request results in a cache hit (block 403). If the read is not a cache hit, operation returns to block 402 to wait for the next read.

If the read request is a cache hit in block 403, the mechanism determines whether the record is in the sequential record black (SRBL) (block 404). Those records found to be sequential are added to the SRBL and not considered. Typically, this would be determined by keeping track of the last one or more read requests and comparing them to the current request to see if they are in sequential order by address. Alternatively, a cache subsystem may have a simple "prefetch" flag indicating how the record got into the cache. Other techniques for determining sequential records may be used depending on the implementation. If the record is in the SRBL block 404, operation returns to block 402 to wait for the next read. If the record is not in the SRBL in block 404, the mechanism determines whether the record is sequential to the previous record (block 405). If the record is sequential, the mechanism updates the SRBL (block 406), and operation returns to block 402 to wait for the next read. Sequential records are added to the SRBL, because those records are likely to be prefetched according to known sequential prefetching techniques.

If the record is not sequential in block 405, the mechanism updates the access table (AT) (block 407). The AT is a two-dimensional table in which each row contains a cache record and the number of times it has been accessed during the polling period. The mechanism adds a new row to the table with a count of 1 (one) if the record is not already in the table. If the record is already in the table, the mechanism increments the count value by 1 (one).

Thereafter, the mechanism determines whether the time is greater than T (block 408). If the time is not greater than T, operation returns to bock 402 to wait for the next read. If the time is greater than T, meaning the polling period has expired, the mechanism sorts the AT by counts (block 409). The mechanism then populates the frequently accessed record list (FARL) with the top N records of in the top N rows of the AT (block 410), where N is a predetermined value. Thereafter, operation ends (block 411).

In phase 2, the mechanism collects trailing record statistics for each record in the FARL. In this phase, the FARL is referred to as "L," which is a list of N records found from phase 1.

L=[$R_1$, $R_2$, ..., $R_N$]←Frequently Accessed Records List

A lookup operation and a reference operation are defined on the list. The lookup operation returns the numerical index of a record in the table given a record as an input. The reference operation returns a record from the list given a numerical index. The following notation is used:

Index I=LOOKUP(L,R), where R is some record in L←lookup operation

Record R=L[I]=$R_I$, where $1 \leq I \leq N$←reference operation

The trailing records are stored in a trailing records table (TRT), which is an array of sub-tables. That is, the TRT has a sub-table (ST) for each record in L. The TRT is referenced in the same way as L, having the same dimensions.

Sub-table ST=TRI[I], where $1 \leq I \leq N$←reference operation

FIG. 5 depicts an example of the format of a sub-table in accordance with an illustrative embodiment. Each sub-table has three columns. The first column contains an index of access number. This also corresponds exactly to the row number; therefore, in many implementations, the first column is implicit. The second column contains the sequence of records that follow the record represented by the sub-table for the given access number in the first column. The sequence has a minimum length of 0 (NULL) and a maximum length of M, where M is a predetermined value. The third column contains either a NULL value or the record L that stopped tracking for the record represented b r the sub-table.

In the example depicted in FIG. 5, tracking for the first entry stopped because the mechanism tracked M trailing records; therefore, the third column contains NULL, indicating tracking did not stop because of encountering a particular record. Tracking for the second entry stopped because the tracking period was exceeded. The third column for the second entry contains the entry in L that caused the mechanism to stop tracking. In the depicted example, the third entry contains a NULL in the second column with a record in L that caused tracking to stop, meaning a frequently accessed record was followed by another non-sequential frequently accessed record.

Three operations are defined on the sub-tables in the TRT. The first operation is to add an empty row, which adds a row to the end of the table with the first column having a value incremented by 1 (one) from the previous row, and the second and third columns with NULL values. The second operation is to add a record to the sequence of records in the second column of the current row. The record is appended to the sequence. The third operation is to add a record to the third column in the case the record is also a record in L.

FIG. 6 is a flowchart illustrating operation of collecting trailing record statistics in accordance with an illustrative embodiment. The following abbreviations are used:

R=most recent record from the read request
CR=current record in L that is being tracked
TRACKING=Boolean representing whether or not any record in L is currently being tracked
INDEX=numerical index of some record in L Operation begins with initialing values (block 600), and the mechanism begins a tracking time period by setting time equal to zero (block 601). The initialization of values is as follows:

INDEX=NULL
CR=NULL
TIME=0 (as in block 601)

The mechanism then waits for the next read (block 602). With the next read, the mechanism determines whether tracking has been started (block 603). If tracking has not been started for the record, the mechanism determines whether the record being read R is in (block 604). If R is in the mechanism starts tracking (Hock 605). To start tracking, the mechanism sets the following values:

TRACKING=TRUE
INDEX=LOOKUP(L, R)
CR=L[INDEX]
ST=TRT[INDEX]

The mechanism also adds an empty row to the sub-table ST. Thereafter, or if R is not in L in block 604, the mechanism determines whether time is greater than the tracking period T (block 606). If time is not greater than the tracking period, operation returns to block 602 to wait for the next read.

If tracking has been started for the record in block 603, the mechanism determines whether R is L (block 607). If R is in L, the mechanism switches tracking to start tracking R (block 608). Once tracking is started for CR, only three events can stop the tracking. One event is that the time exceeds the polling period (block 606: YES). Another event is that the maximum number of trailing records M are added to the second column of ST, in other words, the current row of ST is full. Lastly, trailing stops for CR if one of the trailing records itself is a record in L, in which case the mechanism stops tracking CR and switches tracking to track R.

To switch tracking, the mechanism sets the following values:
Column 3 of ST=R
INDEX=LOOKUP(L, R)
CR=L[INDEX]
CR=R
ST=TRT[INDEX]

The mechanism also adds an empty row to ST. Thereafter, the mechanism determines whether time is greater than the tracking period T (block 606).

If R is not in L block 607, the mechanism appends R to ST (block 609). The mechanism then determines whether the row is full (block 610). If the row is full in block 610, the mechanism stops tracking the current record (block 611). To stop tracking, the mechanism sets the following values:
TRACKING=FALSE
INDEX=NULL
CR=NULL Thereafter, or if the row is not full in block 610, the mechanism determines whether time is greater than the tracking period T (block 606). If the time is greater than the tracking period T in block 606, operation ends (block 612). At the end of the tracking period, the TRT is then analyzed in the next phase.

In accordance with one embodiment, phase 2 can be executed in one of two modes, referred to as "single record" and "multiple records," respectively. In single record mode, M=1, and in multiple records mode, M is some finite natural number greater than 1.

In phase 3, the mechanism analyzes the sub-tables in the TRT in order to find potential candidates for prefetching. The result is a prefetch table PT. FIG. 7 depicts an example of the format of a prefetch table in accordance with an illustrative embodiment. There are N rows in the PT, one for each record in the FARL. There are two columns in each row. The first column contains a record from the FARL, and the second column contains a list of records that should be read into cache each time the record in column one is accessed, assuming the record is not already in cache. The second column may also have an empty list (NULL), meaning no suitable prefetch candidate was found corresponding to the record in the first column.

There are many ways to construct PT based on analysis of TRT. In a first example implementation, the mechanism analyzes the third column for each record in TRT. If there exist any records in the third column for a particular record's sub-table that occur with a frequency greater than some threshold, expressed as a percentage of total accesses, then the mechanism adds those records to the row in PT corresponding to the record in question. This initiates prefetch of the next frequently accessed record, which will result in prefetching trailing records for the next frequently accessed record.

In a second example implementation, the mechanism analyzes the second column for each record in the TRT. If there exist any records in the second column for a particular record's sub-table that occur with a frequency greater than some predetermined threshold, expressed as a percentage of total accesses, then the mechanism adds those records to the row in PT corresponding to the record in question.

Both implementations above can be applied in either single record mode or multiple records mode. In single record mode, the PT can be thought of as a list of tuples of size 2, where the first entry in the tuple is the reference record, and the second entity is NULL or the record to be prefetched when the reference record is read. In the multiple records case, the PT can be thought of as a list of tuples of size M+1, where M refers to the maximum number of trailing records following a reference record from phase 2. The first entry of the tuple is the reference record, and what follows is wither NULL or a list of records to be prefetched once the reference record is read.

In phase 4, a prefetching policy is created and enabled for all rows in TRT that do not have NULL in the second column. Optionally, the SRBL from the first phase can be amended with the records in TRT, which yielded no prefetch candidates.

In phase 5, the prefetching policy is allowed to continue for an extended period of time. During this time other processes may analyze the overall performance of the cache subsystem to evaluate if the new policy has improved caching efficiency. At the end of the period, the cache subsystem may clear the SRBL or keep the SRBL in place before the whole process starts again.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for cache prefetching based on non-sequential tagging cache affinity. The cache subsystem determines frequently accessed non-sequential cache records. The cache subsystem collects trailing record statistics and analyzes the trailing record statistics. The cache subsystem then decides and applies new caching strategies. The cache subsystem may then evaluate the effectiveness of the new strategies.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program stored therein, wherein the computer readable program, when executed on a computing device, causes the computing device to:
    determine frequently accessed non-sequential cache records in a cache subsystem;
    collect trailing record statistics for the frequently accessed non-sequential cache records;
    determine a caching strategy, wherein the caching strategy comprises prefetching a set of trailing records responsive to a read of a given frequently accessed non-sequential cache record; and
    apply the caching strategy to the cache subsystem.

2. The computer program product of claim 1, wherein determining frequently accessed non-sequential cache records comprises:
    for each given read operation in a polling time period, responsive to the given read operation resulting in a cache hit and an address of the given read operation being non-sequential with respect to an address of a previous read operation, updating a count value of a cache record of the given read operation in an access table;
    responsive to expiration of the polling time period, sorting the access table by count value; and
    populating a frequently accessed record list with predetermined number of records from the access table.

3. The computer program product of claim 2, wherein determining frequently accessed non-sequential cache records further comprises:
    responsive to an address of the given read operation being sequential with respect to an address of the previous read operation, adding a cache record of the given read operation to a sequential record block list.

4. The computer program product of claim 1, wherein collecting trailing record statistics for the frequently accessed non-sequential cache records comprises:
    responsive to a given cache record being a frequently accessed non-sequential record, starting tracking of subsequent cache records for the given cache record; and
    for each subsequent cache record that is not a frequently accessed non-sequential record, recording the subsequent cache record in association with the given cache record.

5. The computer program product of claim 4, wherein collecting trailing record statistics for the frequently accessed non-sequential cache records comprises creating a trailing records table having a sub-table for each frequently accessed non-sequential cache record;
    wherein starting tracking of subsequent cache records comprises creating a row in a sub-table of the given cache record in the trailing records table; and
    wherein recording the subsequent cache record in association with the given cache record comprises adding the subsequent cache record to the row in the sub-table of the given cache record.

6. The computer program product of claim 5, wherein collecting trailing record statistics for the frequently accessed non-sequential cache records further comprises stopping tracking of subsequent cache records for the given cache record responsive to a number of subsequent cache records added to the row in the sub-table of the given cache record reaching a predetermined threshold.

7. The computer program product of claim 6, wherein the predetermined threshold is one.

8. The computer program product of claim 5, wherein determining a caching strategy comprises:
    generating a prefetch table comprising a set of cache records to be prefetched in association with each frequently accessed non-sequential cache record.

9. The computer program product of claim 8, wherein the set of cache records to be prefetched in association with a given frequently accessed non-sequential cache record comprises cache records in the row in the sub-table of the given frequently accessed non-sequential cache record that occur with a frequency greater than a predetermined threshold.

10. The computer program product of claim 5, wherein collecting trailing record statistics for the frequently accessed non-sequential cache records further comprises:
    responsive to a given subsequent cache record being a frequently accessed non-sequential record, recording the given subsequent cache record to the row in the sub-table of the given cache record, stopping tracking of subsequent cache records for the given cache record, and switching tracking to the given subsequent cache record.

11. The computer program product of claim 10, wherein determining a caching strategy comprises:
    generating a prefetch table comprising a set of cache records to be prefetched in association with each frequently accessed non-sequential cache record, wherein the set of cache records to be prefetched comprises the given subsequent cache record.

12. The computer program product of claim 4, wherein collecting trailing record statistics for the frequently accessed non-sequential cache records further comprises:

responsive to expiration of the tracking period, stopping tracking of subsequent cache records for the given cache record.

13. The computer program product of claim 1, wherein the computer readable program further causes the computing device to evaluate effectiveness of the caching strategy.

14. The computer program product of claim 1, wherein the computer readable program is stored in a computer readable storage medium in a data processing system and wherein the computer readable program was downloaded over a network from a remote data processing system.

15. The computer program product of claim 1, wherein the computer readable program is stored in a computer readable storage medium in a server data processing system and wherein the computer readable program is downloaded over a network to a remote data processing system for use in a computer readable storage medium with the remote system.

16. An apparatus, comprising:
a processor; and
a memory coupled to the processor, wherein the memory comprises instructions which, when executed by the processor, cause the processor to:
determine frequently accessed non-sequential cache records in a cache subsystem;
collect trailing record statistics for the frequently accessed non-sequential cache records;
determine a caching strategy, wherein the caching strategy comprises prefetching a set of trailing records responsive to a read of a given frequently accessed non-sequential cache record; and
apply the caching strategy to the cache subsystem.

17. The apparatus of claim 16, wherein determining frequently accessed non-sequential cache records comprises:
for each given read operation in a polling time period, responsive to the given read operation resulting in a cache hit and an address of the given read operation being non-sequential with respect to an address of a previous read operation, updating a count value of a cache record of the given read operation in an access table;
responsive to expiration of the polling time period, sorting the access table by count value; and
populating a frequently accessed record list with predetermined number of records from the access table.

18. The apparatus of claim 16, wherein collecting trailing record statistics for the frequently accessed non-sequential cache records comprises:
responsive to a given cache record being a frequently accessed non-sequential record, starting tracking of subsequent cache records for the given cache record; and
for each subsequent cache record that is not a frequently accessed non-sequential record, recording the subsequent cache record in association with the given cache record.

19. The apparatus of claim 16, wherein determining a caching strategy comprises:
generating a prefetch table comprising a set of cache records to be prefetched in association with each frequently accessed non-sequential cache record.

20. A method, in a data processing system, for cache prefetching based on non-sequential access, the method comprising:
determining, by a processor of the data processing system, frequently accessed non-sequential cache records in a cache subsystem within the data processing system;
collecting, by the processor in a memory of the data processing system, trailing record statistics for the frequently accessed non-sequential cache records;
determining, by the processor, a caching strategy, wherein the caching strategy comprises prefetching a set of trailing records responsive to a read of a given frequently accessed non-sequential cache record; and
applying, by the processor, the caching strategy to the cache subsystem such that the cache subsystem performs cache prefetching according to the caching strategy.

21. The method of claim 20, wherein determining frequently accessed non-sequential cache records comprises:
for each given read operation in a polling time period, responsive to the given read operation resulting in a cache hit and an address of the given read operation being non-sequential with respect to an address of a previous read operation, updating a count value of a cache record of the given read operation in an access table;
responsive to expiration of the polling time period, sorting the access table by count value; and
populating a frequently accessed record list with predetermined number of records from the access table.

22. The method of claim 20, wherein collecting trailing record statistics for the frequently accessed non-sequential cache records comprises:
responsive to a given cache record being a frequently accessed non-sequential record, starting tracking of subsequent cache records for the given cache record; and
for each subsequent cache record that is not a frequently accessed non-sequential record, recording the subsequent cache record in association with the given cache record.

23. The method of claim 20, wherein determining a caching strategy comprises:
generating a prefetch table comprising a set of she records to be prefetched in association with each frequently accessed non-sequential cache record.

* * * * *